United States Patent Office 3,505,251
Patented Apr. 7, 1970

3,505,251
SPONGE RUBBER FROM DIMERCAPTAN BLENDS
Paul F. Warner, Phillips, Tex., assignor to Phillips
Petroleum Company, a corporation of Delaware
No Drawing. Filed Sept. 12, 1966, Ser. No. 578,507
Int. Cl. C08d 13/08
U.S. Cl. 260—2.5                                6 Claims

ABSTRACT OF THE DISCLOSURE

Foam rubber is prepared by blending a dimercaptan with a rubbery polymer and curing the dimercaptan in the presence of lead peroxide.

This invention relates to sponge rubber. In another aspect, this invention relates to a novel method of preparing sponge rubber from dimercaptan-rubber blends. In another aspect, this invention relates to a sponge rubber composition comprising rubber and dimercaptans cured with lead peroxide. In another aspect, this invention relates to a novel method of preparing sponge rubber which can be used as a caulk or sealant material.

Foam rubber has many potential applications both in industry and by the individual consumer. It can be used as a packing for cushions, adhesives, insulators, filters, and a caulk or sealant.

In most operations, it is necessary that sealant compositions be water tight, gas tight, and resistant to hydrocarbon solvents. A particularly important and exacting application for sealants of this type is found in the aircraft industry where efficient caulking of aluminum seams is required in the fabrication of fuel cells or bunkers. Such sealants are used along the seams joining the aluminum sheet stock and in the holes where rivets are to be placed. Sealants used in such applications must be flexible over a wide temperature range, resistant to hydrocarbon solvents and capable of being easily applied. Such sealants can also be used for the glass to metal seal in the windows of aircraft. Such sealants are also useful for binding material, such as for binding solid propellants in rockets. These sealants may also be used in everyday operations, such as caulks for curtain walls, doors, and windows.

Various materials have been used or proposed for such applications. However, many of these known materials while being generally satisfactory, have some serious drawbacks which have brought about a search for materials which can be substituted therefore. The ideal sealant is one that is impermeable to water, air, and hydrocarbon solvents, but yet will swell while it is forming or curing to completely fill the crack or void that is desired to be sealed.

One object of this invention is to provide a novel sealant composition.

Another object of this invention is to provide a novel method of preparing sponge rubber from dimercaptan-rubber blends using lead peroxide as a curing agent.

A further object of this invention is to provide a dimercaptan-rubber composition cured by lead peroxide.

Other objects, advantages and features of this invention will be apparent to one skilled in the art upon reading the accompanying disclosure.

According to the invention, dimercaptans are thoroughly admixed with rubbery compounds to form a mixture of about 1 to 30 percent by weight of said rubbery compounds. The resulting mixture or solution is then cured with lead peroxide. When the lead peroxide is added, an exothermic reaction with the mercaptan occurs, which appears to be as illustrated by the following equation $$2HSRSH + 2PbO_2 \rightarrow HS—R—SS—R—SH + 2PbO + H_2O$$

This reaction is quite fast, and the exotherm vaporizes the water that is formed, causing the polymer to foam up to about double its original size. It is believed that the rubbery polymer forms the backbone of the foamed product and thereby enables the foam to persist long enough for the cure to go to completion.

The dimercaptan reactants that can be employed according to the invention can be represented by the formula: HSRSH where R is an organic radical containing up to and including 20 carbon atoms per molecule. In the above formula, R can be a hydrocarbon radical such as aliphatic, cycloaliphatic, aryl and the like, or a heterocyclic structure such as:

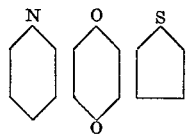

as well as other organic radicals. The cyclic hydrocarbon dimercaptans having up to 10 carbon atoms, as exemplified by 2,9-p-menthanedithiol are preferred.

Representative examples of suitable dimercaptan compounds which can be employed according to the invention including dimercaptoethane, dimercaptopropane, 1,5-dimercaptopentane, 1,6-dimercaptohexane, 1,8-dimercaptodecane, 2,3 - dimercaptopentadecane, 1,4-dimercapto-2-butene, dimercaptoethyl ether, dimercaptopropyl ether, dimercaptoxylene, 2,9 - p - menthanedithiol, dimercaptoalpha terpentene, 2,5 - dimercaptopyridene, ethylcyclohexyl dimercaptan and the like.

The rubbery polymer utilized can be any known natural or artificial rubber. For example, homopolymers of conjugated dienes, chlorinated conjugated dienes, and mixtures or combinations thereof, copolymers of conjugated dienes, chlorinated dienes, and mixtures and combinations thereof, acrylic rubbers, Thiokol (polysulfide) rubbers, and silicone rubbers may be used in this invention. Rubber homopolymers of 1,3-butadiene having high cis-linkage and copolymers of conjugated dienes, especially butadiene, with monomeric materials such as styrene, are preferred. The synthetic rubbers which are utilized in the blended compositions of this invention can be produced by any of the known polymerization processes which yield these polymers.

Other additives such as fillers, e.g. carbon black, silica, titanium dioxide, calcium silicate, hydrated alumina, calcium carbonate, and the like, antioxidants, softeners, and other additives and preservatives known in the rubber art can be present in the blend. For example, dibutylphthalate may be added as a plasticizer, and stearic acid may be added as a retarder.

The consistency of the cured spongy dimercaptan-rubber blend cured according to the invention will vary depending upon the viscosity and the molecular weight of the dimercaptan and rubber used, and the amount of lead peroxide vulcanizing agent employed during the curing operation. The amount of lead peroxide used will generally be in the range of 0.1–1.2 parts by weight of lead peroxide to one part by weight of dimercaptan-rubber solution or mixture. These cured blends can contain from 1 to 30 percent by weight rubbery materials and the resultant blend is fairly soft and pliable. The preferred amount of rubbery material ranges from 10 to 20 percent by weight of the resulting blend.

The blends of this invention can be prepared in a variety of ways, such as admixing the dimercaptan with a solution of rubber in toluene and then evaporating off the toluene leaving the rubber in solution in the dimercaptan or by incorporating precipitated rubber into a liquid dimercaptan. After admixing or blending the rubber with the dimercaptan in the desired ratio, lead peroxide is then added to cure and form the resulting foam rubber product. As stated, the reaction is exothermic and can be carried out at room temperature, but heat can be applied in order to speedily initiate the reaction. If desired, a plasticizer such as dibutylphthalate and a retarder such as stearic acid may be added to any particular blend.

This reaction can be carried out batchwise in molds in order to form blocks or sheets of the sponge rubber to be used commercially as padding or insulating material. When being used as caulk or sealant, the dimercaptan and rubber can be thoroughly admixed with a suitable retarder and then extruded through a heated nozzle of a caulking gun and allowed to foam up and set in place. The caulk will then swell during curing and completely fill up all of the void space which is desired to be sealed.

A better understanding of the invention can be obtained by referring to the following illustrative example, which is not intended, however, to be unduly limitative of the invention.

EXAMPLE

Run 1

A solution containing 8 parts by weight 2,9-p-menthanedithiol and 2 parts by weight cis-1,4-polybutadiene was formed by thoroughly admixing the 2,9-p-menthanedithiol and cis-1,4-polybutadiene. 4.5 parts by weight dibutylphthalate was added as a plasticizer, and 0.15 part by weight stearic acid was added as a polymerization retarder. The latter was necessary because the $PbO_2$ cure is normally very fast and exothermic in nature. 9 parts by weight of $PbO_2$ was then added and the solution was slightly warmed to initiate the reaction. The mixture foamed up to about twice its original volume in about five minutes. The highest temperature recorded was about 225° F. and the cure was completed in about 60 minutes. The resulting sponge rubber was pliable and suitable as a cushion, insulator, or caulk material.

Run 2

8 parts by weight 2,9-p-menthanedithiol was mixed with 4.5 parts by weight dibutylphthalate and 0.15 parts by weight stearic acid. 9 parts by weight $PbO_2$ was then added and the solution was warmed to initiate the reaction. The mixture immediately began to foam and continued to foam for about ten minutes; however, the foam collapsed before the set was complete to form a dense material that was hard to the touch and relatively non-pliable.

From the foregoing runs, it was concluded that polybutadiene in the first mixture formed the backbone of the foamed product and enabled the foam to persist long enough for the cure to go to completion.

As will be evident to those skilled in the art, various modifications of this invention can be made or followed in the light of this disclosure without departing from the spirit or scope thereof.

I claim:
1. A method of preparing a foam rubber which comprises admixing a dimercaptan having the general formula of HSRSH wherein R represents an organic radical having from 1 to 20 carbon atoms, with a compound selected from the group consisting of (a) homopolymers of conjugated dienes, chlorinated conjugated dienes, and mixtures thereof; (b) copolymers of conjugated dienes, copolymers of chlorinated conjugated dienes, and mixtures thereof; (c) acrylic rubbers; (d) polysulfide rubbers; and (e) silicone rubbers, said admixture containing from 1 to 30 percent by weight of said compound, and foaming and curing said admixture by adding to said admixture from 0.1–1.2 parts by weight $PbO_2$ to one part by weight of the admixture.

2. The method of claim 1 wherein said compound is polybutadiene which contains a major portion of cis-1,4 linkage.

3. The method of claim 1 wherein said dimercaptan is 2,9-p-menthanedithiol.

4. The method of claim 1 wherein 8 parts by weight 2,9-p-menthanedithiol and 2 parts by weight polybutadiene which contains a major portion of cis-1,4 linkage are blended to form a solution and 9 parts by weight $PbO_2$ are added to said solution to cause said solution to foam and cure.

5. A cured foamed composition comprising 99 to 70 percent by weight dimercaptan having a general formula HS—R—SS—R—SH wherein said R represents an organic radical having from 1 to 20 carbon atoms, and 1 to 30 percent by weight of a compound selected from the group consisting of (a) homopolymers of conjugated dienes, chlorinated conjugated dienes, and mixtures thereof; (b) copolymers of conjugated dienes, copolymers of chlorinated conjugated dienes, and mixtures thereof; (c) acrylic rubbers; (d) polysulfide rubbers; and (e) silicone rubbers, said composition having been cured by $PbO_2$.

6. The composition of claim 5 wherein said dimercaptan is 2,9-p-menthanedithiol and said compound is polybutadiene, a major portion of which is joined together by cis-1,4 linkage.

References Cited

UNITED STATES PATENTS

| | | | |
|---|---|---|---|
| 2,833,731 | 5/1958 | Pfisterer et al. | 260—2.5 |
| 2,891,017 | 6/1959 | Kern et al. | 260—2.5 |
| 3,052,642 | 9/1962 | Hunter | 260—2.5 |
| 3,041,304 | 6/1962 | Gardner et al. | 260—79.5 |
| 3,095,387 | 6/1963 | Kleinfeld et al. | 260—2.5 |

OTHER REFERENCES

W. Hoffman—"Vulcanization and Vulcanizing Agents"—1965, pp. 278 and 279.

SAMUEL H. BLECH, Primary Examiner

U.S. Cl. X.R.

260—31.8, 37, 41, 41.5, 79.5, 823, 824, 887, 890, 901